United States Patent [19]

Young

[11] 4,404,116
[45] Sep. 13, 1983

[54] NONCORROSIVE UREA-SULFURIC ACID REACTION PRODUCTS

[75] Inventor: Donald C. Young, Fullerton, Calif.

[73] Assignee: Union Oil Company of California, Los Angeles, Calif.

[21] Appl. No.: 330,904

[22] Filed: Dec. 15, 1981

[51] Int. Cl.³ .................. C05C 9/00; C23F 11/16; C23F 11/18

[52] U.S. Cl. ...................... 252/182; 71/28; 71/DIG. 4; 71/99; 106/14.15; 106/14.21; 106/14.33; 252/387; 252/389 R; 422/12; 422/16; 564/3; 564/17; 564/68

[58] Field of Search .............. 252/182, 389 R, 387; 71/28, DIG. 4, 99; 106/14.15, 14.21, 14.33; 422/12, 16; 564/3, 17, 68

[56] References Cited

U.S. PATENT DOCUMENTS

| | | | |
|---|---|---|---|
| 3,313,613 | 4/1967 | Green | 71/28 |
| 3,879,305 | 4/1975 | Ehrlich | 252/402 |
| 4,028,088 | 6/1977 | Young et al. | 71/28 |
| 4,071,470 | 1/1978 | Davidson et al. | 252/389 R |
| 4,116,664 | 9/1978 | Jones | 71/29 |
| 4,143,119 | 3/1979 | Asperger et al. | 252/389 R |
| 4,214,888 | 7/1980 | Young | 71/DIG. 4 |

OTHER PUBLICATIONS

D. F. du Toit, Verslag Akad. Wetenschappen, 22, 573-4 (abstracted in Chemical Abstracts, 8, 2346, 1914).
L. H. Dalman, "Ternary Systems of Urea and Acids. I. Urea, Nitric Acid and Water. II. Urea, Sulfuric Acid and Water. III. Urea, Oxalic Acid and Water."; JACS, 56, 549-53 (1934).
Sulfur Institute Bulletin No. 10 (1964), "Adding Plant Nutrient Sulfur to Fertilizer".
I. N. Putilova, et al., "Metallic Corrosion Inhibitors," Pergamon Press 1960, pp. 76-80.
Herbert H. Uhlig, PH.D. "The Corrosion Handbook" sponsored by The Electrochemical Society, Inc., John Wiley & Sons, Inc. 1948, pp. 910-912.
L. L. Shreir, "Corrosion", vols. 1 and 2, pp. 3.55-3.58, 18.9-18.11, 18.16-18.19, 18.41-18.43, John Wiley & Sons, Inc. 1963.

Primary Examiner—Irwin Gluck
Attorney, Agent, or Firm—Dean Sandford; Gregory F. Wirzbicki; Michael H. Laird

[57] ABSTRACT

Improved liquid, urea-sulfuric acid compositions noncorrosive to stainless steel contain about 5 to about 75 weight percent urea, about 5 to about 85 weight percent sulfuric acid, 0 to about 75 weight percent water and a corrosion inhibiting amount of a cupric ion-containing compound, in which the urea and sulfuric acid together comprise at least about 25 weight percent of the composition, and in which at least a portion of the urea and sulfuric acid are present as monourea sulfate, diurea sulfate or combinations thereof. The compositions may also contain amounts of selected dialkylthioureas sufficient to reduce their corrosivity to carbon steel.

12 Claims, 6 Drawing Figures

NONCORROSIVE UREA-SULFURIC ACID REACTION PRODUCTS

BACKGROUND OF THE INVENTION

1. Field of the Invention

This invention relates to the field of liquid urea-sulfuric acid compositions, and particularly to such compositions having reduced corrosivity to stainless steel. The compositions are stable homogeneous solutions of urea-sulfuric acid reaction products of significantly reduced corrosivity toward stainless steels even at elevated temperatures and under flow conditions. Thus, they enable the use of such urea-sulfuric acid reaction products at elevated temperatures and/or under flow conditions during their manufacture, transport or use in stainless steel equipment.

2. Description of the Prior Art

Both urea and sulfuric acid are widely used for a variety of purposes in numerous industries as fertilizers, soil adjuvants, chemical treating agents, chemical precursors and reactants. They are sometimes useful in combination, particularly in the agricultural industry, when the simultaneous addition of urea and sulfur to the soil is desired.

Previous investigators have observed that urea, sulfuric acid and, optionally water, can be reacted to form concentrated solutions of urea and sulfuric acid reaction products in which the urea is present as mono- and/or diurea sulfate. However, they did not recognize that the reaction product solutions of different urea/sulfuric acid ratio exhibit markedly different corrosivity towards stainless steel particularly at elevated temperatures and/or under flow conditions, or that the corrosivity of all of the solutions towards stainless steel could be markedly reduced by the addition of corrosion inhibiting amounts of cupric ion-containing compounds.

D. F. du Toit found that urea formed certain compounds with oxalic, acetic, hydrochloric, nitric and sulfuric acids, and that the resulting compounds were stable in contact with their solutions at 20° C. Verslag Akad. Wetenschappen, 22, 573–4 (abstracted in Chemical Abstracts, 8, 2346, 1914).

L. H. Dalman expanded on du Toit's work by developing the phase relationships between the solid phase and saturated solutions at 10° C. (50° F.) and 25° C. (77° F.). "Ternary Systems of Urea and Acids. I. Urea, Nitric Acid and water. II. Urea, Sulfuric Acid and Water. III. Urea, Oxalic Acid and Water"; JACS, 56, 549–53 (1934).

In the article "Adding Plant Nutrient Sulfur to Fertilizer," Sulfur Institute Bulletin No. 10 (1964), the Sulfur Institute discussed the addition of nutrient sulfur to fertilizers and mentioned that urea reacts with sulfuric acid to form two complexes of urea sulfate which are useful fertilizers.

Jones, U.S. Pat. No. 4,116,664 disclosed what is referred to therein as a tortuous, multistage process for producing combinations of urea and sulfuric acid in which portions of the sulfuric acid are incrementally added to and reacted with the total amount of urea to be reacted in each of several stages until the total amount of sulfuric acid has been reacted with the urea. The resulting product is unstable and requires further processing. Jones preferably adds water later as required to obtain stability and the desired composition. He discloses that the reaction can be carried out at temperatures of 100° to 200° F. and that if the sulfuric acid is added to the total amount of urea at a rate which is too fast the temperature goes to about 200° to 225° F. and that a gas is emitted that causes changes in product characteristics such as solidification. The patent states that temperatures of 160° to 200° F. are preferred and that the products can be used as fertilizers.

A wide variety of compounds, including cupric sulfate and dialkylthioureas, are known to reduce the corrosivity of sulfuric acid to stainless steels and carbon steels.

Although these investigators disclosed several characteristics of urea-sulfuric acid combinations and methods of making those combinations, and that the products were useful soil adjuvants and/or fertilizers, they did not recognize that the corrosivity of the urea-sulfuric acid reaction products in either concentrated or diluent form to stainless steel varies dramatically as a function of the urea/sulfuric acid weight ratio, or that the corrosivity of all solutions to stainless steel at elevated temperatures and/or under fluid flow conditions can be dramatically reduced by the addition of corrosion inhibiting amounts of cupric ion-containing compounds.

Previous investigators also were not aware that the corrosion characteristics of the urea-sulfuric acid compositions of this invention differ markedly from those of sulfuric acid. For instance, all of the sulfuric acid inhibitors, with the exception of cupric ion, have little or no beneficial effect on the urea-sulfuric acid compositions, and may significantly increase corrosion rate. Furthermore, none of the known inhibitors have any significant beneficial effect on carbon steel corrosion by compositions having urea/sulfuric acid molar ratios between 1 and 2. Carbon steel corrosivity is relatively low within that composition range but is intolerably high with compositions having urea/sulfuric acid molar ratios above 2 or below 1. Thus, carbon steel corrosivity increases dramatically as sulfuric acid concentration is either increased or decreased relative to urea concentration outside this range of molar ratios. Another anomalous characteristic of these compositions is that some, but not all of them are significantly more corrosive to stainless steel than they are to carbon steel. Thus, 10-0-0-19 corrodes AISI C-1010 carbon steel at a rate of 56 mils per year under static conditions at 150° F. and corrodes AISI type 316 stainless steel at 300 mils per year under identical conditions. These properties are not characteristic of sulfuric acid.

It is therefore one object of this invention to provide improved, liquid urea-sulfuric acid compositions.

It is another object of this invention to provide liquid urea-sulfuric acid reaction product compositions which are noncorrosive to stainless steel even at elevated temperatures or under fluid flow conditions.

Another object is the provision of urea-sulfuric acid compositions of reduced corrosivity to both stainless steel and carbon steel.

Other objects, aspects and advantages of this invention will be apparent to one skilled in the art in view of the following disclosure, the drawings and the appended claims.

SUMMARY OF THE INVENTION

This invention relates to liquid urea-sulfuric acid compositions which are noncorrosive to stainless steel under either quiescent or fluid flow conditions, even at elevated temperatures. These compositions contain corrosion inhibiting amounts of one or more cupric ion-containing compounds and can be used in stainless steel equipment with considerably less corrosion than would result from the use of similar compositions in the absence of cupric ion-containing compounds. The invention also relates to compositions containing cupric ion and one or more dialkythioureas which are relatively noncorrosive to both stainless steel and carbon steel.

In accordance with one embodiment of this invention, homogeneous, liquid urea-sulfuric acid compositions noncorrosive to stainless steel comprise about 5 to about 75 weight percent urea, about 5 to about 85 weight percent sulfuric acid, 0 to about 75 weight percent water and a corrosion inhibiting amount of one or more cupric ion-containing compounds. The urea and sulfuric acid, in combination, comprise at least about 25 weight percent of the composition, and at least a portion of the urea and sulfuric acid are present as monourea sulfate, diurea sulfate, or combinations thereof.

In accordance with another embodiment of this invention, the compositions have sulfuric acid to urea weight ratios of about 1.5 or less and contain an amount of a cupric ion-containing compound corresponding to a cupric ion concentration of at least about 25 ppm.

In accordance with another embodiment of this invention, the urea-sulfuric acid compositions have sulfuric acid/urea weight ratios of at least about 1.5 and contain an amount of a cupric ion-containing compound corresponding to a cupric ion concentration of at least about 250 ppm.

In accordance with yet another embodiment of this invention, urea-sulfuric acid compositions relatively noncorrosive to both stainless steel and carbon steel comprise corrosion inhibiting amounts of one or more cupric ion-containing compounds and one or more dialkylthioureas.

BRIEF DESCRIPTION OF THE DRAWINGS

The invention will be more readily understood by reference to the drawings of which.

DETAILED DESCRIPTION OF THE INVENTION

Figure 1:
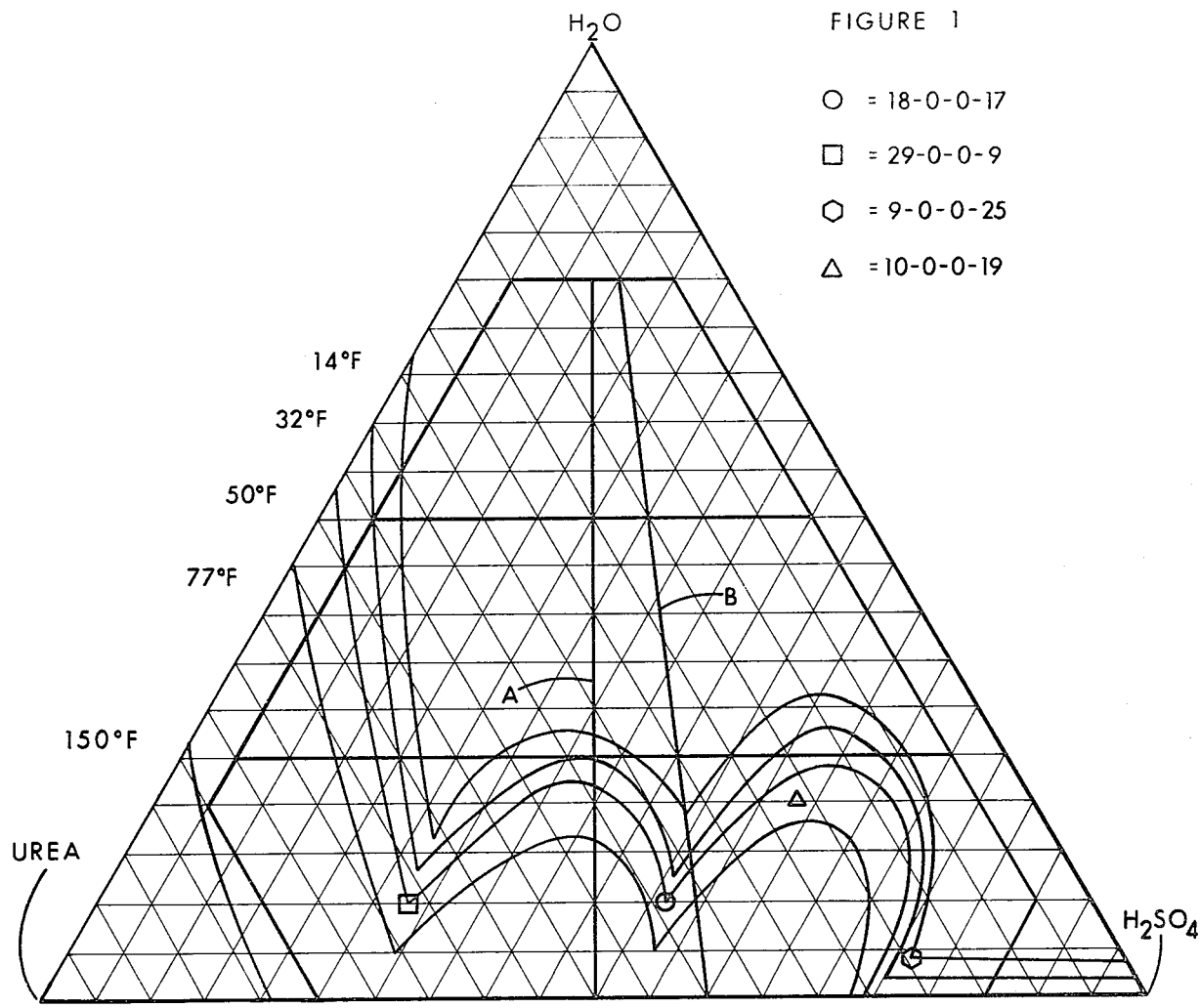
FIG. 1 is a ternary phase diagram for the urea, sulfuric acid, and water system illustrating isotherms at several different temperatures, the existence of three prominent eutectics along these isotherms, and the urea-sulfuric reaction products encompassed by this invention.

The compositions of this invention comprise liquid urea-sulfuric acid reaction products containing 5 to about 85, preferably about 10 to about 80 weight percent sulfuric acid, about 5 to about 75 weight percent, preferably about 10 to about 70 weight percent urea, and 0 to about 75, usually 0 to about 50, and preferably 0 to about 25 weight percent water. Urea and sulfuric acid, in combination, constitute at least about 25, usually at least about 50, and preferably at least about 75 weight percent of the composition. The more concentrated compositions are particularly preferred during manufacture and transportation due to the lower volumes and weights of materials that must be handled and transported. At least a portion of the urea and sulfuric acid are present as mono- or diurea sulfates or combinations thereof.

The four-digit composition designations used herein, e.g., 18-0-0-17, are conventionally used in the agricultural industry to designate the concentration of nitrogen, phosphorus (as $P_2O_5$), potassium (as $K_2O$), and a fourth component—in this case sulfur expressed as the element. Thus, the composition 18-0-0-17 contains 18 weight percent nitrogen derived from urea and 17 weight percent sulfur derived from sulfuric acid. Using the atomic weights for nitrogen (14) and sulfur (32) and the molecular formulas and molecular weights for urea (60.06) and sulfuric acid (98.08), it can be readily determined that this formulation contains 38.6 weight percent urea and 52.1 weight percent sulfuric acid. By difference, the solution contains 9.3 weight percent water. The concentrations of sulfuric acid and urea in all other compositions can be determined by the same procedure.

The compositions and some of their physical properties are illustrated by the ternary phase diagram of FIG. 1. The phase diagram defines the relative proportions in weight percent for each of the three components—urea, sulfuric acid, and water—at any point within the diagram. At each apex of the triangle the system consists completely of the indicated component. Thus, the composition at the urea apex is 100 percent urea and dimishes linearly to 0 along a straight line from the urea apex to the mid-point of the $H_2O-H_2SO_4$ boundary line, i.e., the side of the triange opposite the urea apex. The same is true of the remaining two components: water and sulfuric acid.

The diagram also illustrates the isotherms for the system at 14° F., 32° F., 50° F., 77° F., and 150° F. The 150° F. isotherm is illustrated only partially at the lower left-hand portion of the diagram. Each isotherm defines compositions which, if cooled below the temperature indicated for the respective isotherm, will precipitate components of the system. However, the solutions will super-cool dramatically, e.g., by as much as 50° F., or more, under quiescent conditions in the absence of seed crystals, impurities, etc., that promote crystallization.

As indicated by the pattern of the isotherms, systems having a fixed ratio of urea to sulfuric acid become more stable at lower temperatures as the water concentration is increased. This is true throughout most of the phase diagram with the exception of the region in the vicinity of the higher acid eutectic in the lower right-hand portion of the phase diagram.

Three prominent eutectics are apparent within the region of the illustrated isotherms. Each eutectic represents a discontinuity in the response of the system, e.g., of crystallization point, to changes in solute concentration, and indicates the points of maximum solute concentration for a given isotherm in the regions of the phase diagram associated with those eutectics.

As indicated in the legend on FIG. 1, the left-hand eutectic on the 50° F. isotherm corresponds to the formulation 29-0-0-9. The middle eutectic on the same isotherm corresponds to the composition 18-0-0-17. The right-hand eutectic on the 14° F. isotherm corresponds to 9-0-0-25, and the formulation intermediate the 50° F. and the 77° F. isotherms between the middle and right-hand eutectics indicated by a triangular designation corresponds to 10-0-0-19.

The bold lines within the diagram generally define the boundaries of the preferred reaction products of this invention.

Bold lines parallel to one side of the phase diagram define a fixed concentration of the component designated at the apex of the triangle opposite the side to which that line is parallel. Thus, the higher horizontal line in FIG. 1 borders the area of formulations containing 75 percent water or less and varying amounts of urea and sulfuric acid. The area below the horizontal line across the center of the diagram defines formulations containing 50 weight percent water or less.

Vertical line A in the center of the diagram intersecting the urea-sulfuric acid boundary at the half-way point defines compositions having a one-to-one weight ratio of sulfuric acid to urea. If extended vertically, line A would intersect the water apex. Line B represents reaction products having $H_2SO_4$/urea weight ratios of 1.5 and intersects the urea-sulfuric acid boundary at the point corresponding to 40 weight percent urea and 60 weight percent sulfuric acid. If extended, line B would pass through the water apex of the diagram. All formulations to the right of line B have $H_2SO_4$/urea weight ratios of 1.5 or greater.

The compositions of this invention contain corrosion inhibiting amounts of cupric ion-containing compounds in concentrations sufficient to reduce the corrosion of the composition to stainless steel. The corrosion inhibiting compounds are usually present in amounts corresponding to cupric ion concentrations of at least about 25 ppm, and generally at least about 50 ppm.

Different cupric ion concentrations are required to achieve comparable corrosivity in different compositions due to the dramatic differences in corrosivity and inhibitor effect between different compositions encompassed by this invention. For instance, compositions having sulfuric acid/urea weight ratios of less than 1.5 should contain at least about 25 ppm cupric ion, while compositions having sulfuric acid/urea weight ratios greater than about 1.5 should have cupric ion concentrations of at least about 250 ppm.

The inhibitor concentration required to obtain a certain level of corrosivity with a given composition at a particular temperature and flow velocity can be readily determined by exposing a standard sample of the stainless steel to be employed to different samples of the given composition containing various inhibitor concentrations at the temperature and flow velocity involved. The results of this test will provide a correlation similar to that illustrated in FIG. 2 which is a correlation of the corrosion rate of 316 stainless steel at 150° F. and 15 feet per second fluid velocity at various cupric ion concentrations (added as cupric sulfate) for the compositions 18-0-0-17, 29-0-0-9, and 10-0-0-19. These correlations illustrate that the corrosivities of 18-0-0-17 and 29-0-0-9 are remarkably similar under these test conditions but that they differ dramatically in corrosivity and in their response to cupric ion concentration from 10-0-0-19.

Figure 2:
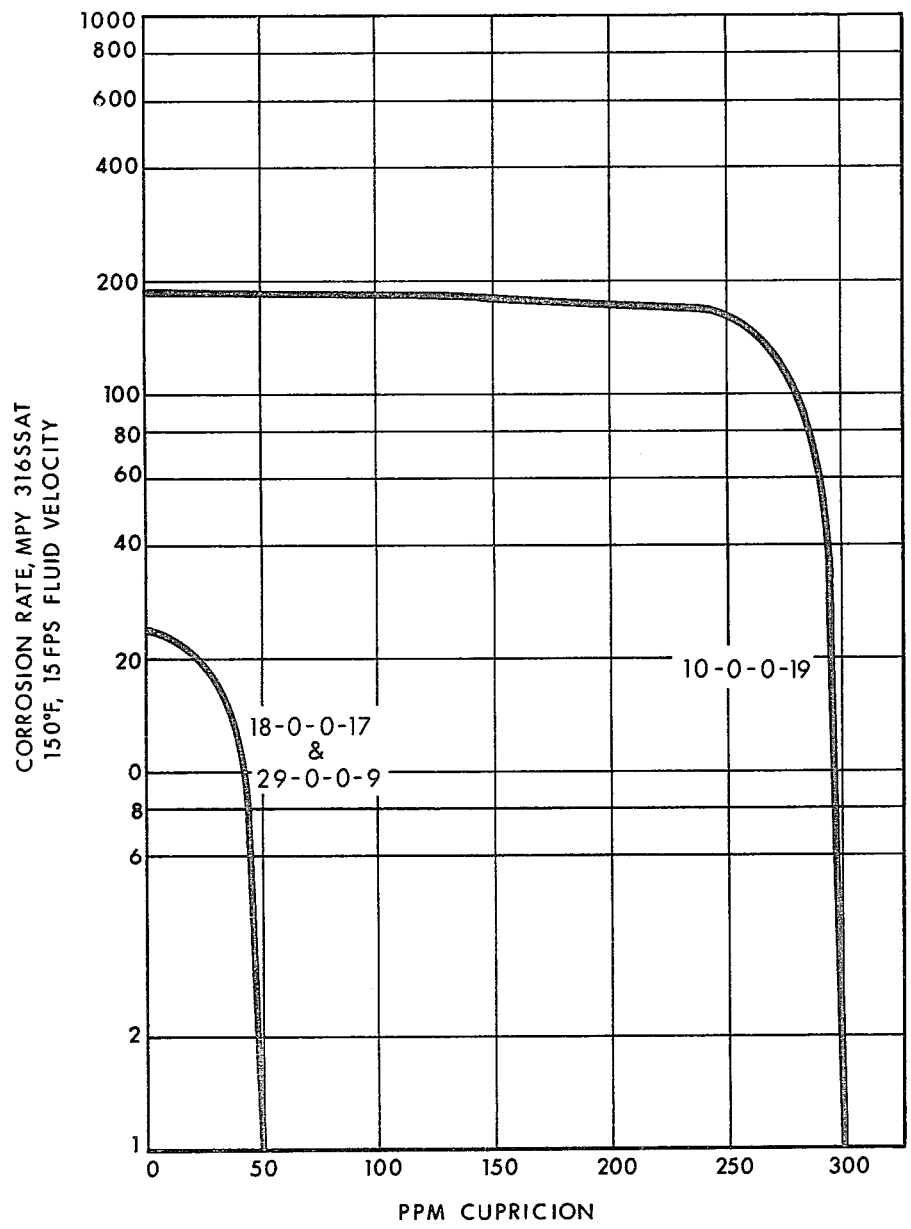
FIG. 2 is a correlation of corrosion rate of AISI 316 stainless steel at 15 feet per second fluid velocity and 150° F. versus cupric ion concentration for the three designated products.

The corrosivity of both 18-0-0-17 and 29-0-0-9 at 0 cupric ion concentration was approximately 24 mils per year (MPY) under the test conditions illustrated in FIG. 2, and decreased rapidly with increased cupric ion concentration to essentially zero at a cupric ion concentration of 50 ppm. In contrast, the corrosivity of 10-0-0-19 was approximately 190 mils per year at 150° F. and 15 feet per second (fps.) fluid velocity in the absence of cupric ion, and decreased only gradually as cupric ion concentration was increased up to about 250 ppm. After that point the corrosivity of the 10-0-0-19 composition decreased dramatically to essentially zero mils per year at a cupric ion concentration of 300 ppm.

Correlations similar to those illustrated in FIG. 2 can be obtained for any composition encompassed by this invention under any conditions of temperature, fluid flow velocity and cupric ion concentration by the test procedure discussed above.

Reduced corrosivity is dependent only upon the presence of sufficient cupric ion regardless of the form in which it is added. Thus, any organic or inorganic copper-containing compounds can be employed which, when added to the composition, either cause the formation of or introduce cupric ion into the composition. However, inorganic compounds such as cupric oxide, sulfate, nitrate, halides, and the like are presently preferred due to their ready availability and relatively low cost. Cupric sulfate is particularly preferred in many formulations since the sulfate anion does not introduce additional ions into the composition. Organic or inorganic compounds other than the sulfates may be converted to the sulfate in solution, particularly in compositions containing higher proportions of sulfuric acid. Nevertheless, such compounds can be effectively used within the scope of this invention since they effectively introduce cupric ion into the composition.

The corrosivity of these compositions either with or without the cupric ion inhibitors, is a function of temperature, flow velocity and composition. Corrosion rate increases significantly with temperature for all compositions. For instance, in the absence of corrosion inhibitors, 10-0-0-19 exhibits a corrosion rate of approximately 190 miles per year at 150° F. and 15 feet per second fluid velocity as illustrated in FIG. 2 as compared to a corrosion rate of approximately 630 mils per year at a temperature of 170° F. under otherwise identical conditions. Similarly, the 18-0-0-17 eutectic composition has a corrosion rate of about 24 mils per year on 316 stainless steel at 150° F. and 15 feet per second fluid velocity in the absence of the cupric ion inhibitor as illustrated in FIG. 2, as compared to a corrosion rate of about 44 mils per year at 170° F. under otherwise identical conditions.

The corrosivity of these compositions to stainless steel is significantly affected by fluid velocity. Under quiescent conditions, i.e., zero fluid velocity, the corrosion rates for stainless steels are very low, possibly due to surface passivation. However, any significant fluid flow, i.e., 0.5 feet per second or higher, negates the surface passivating effect and promotes significant corrosion. Thus, in the absence of corrosion inhibitors, these compositions become corrosive to stainless steels under any conditions that produce relative movement between the composition and the steel such as fluid flow through valves, pipelines, pumps and the like, agitation in reactors or mixing vessels, etc.

The effect of composition on stainless steel corrosion rate is referred to generally above and is illustrated in FIG. 2. Stainless steel corrosion rate generally increases with H$_2$SO$_4$/urea weight ratio and the amount of inhibitor required to produce a significant reduction in corrosivity also generally increases significantly as the H$_2$SO$_4$/urea weight ratio increases. Thus, higher cupric ion concentrations are required for the higher H$_2$SO$_4$/urea weight ratio compositions, e.g., compositions having ratios of about 1.5 or greater.

Cupric ion does not significantly inhibit the corrosivity of these compositions to nonstainless carbon steels and the dialkylthiourea carbon steel inhibitors discussed hereinafter do not reduce corrosivity to stainless steels. Furthermore, numerous compounds other than dialkylthioureas and cupric ion-containing compounds, known to inhibit the corrosivity of sulfuric acid to stainless steels and/or carbon steels do not significantly reduce corrosion rate as illustrated in the example.

The compositions of this invention may also contain amounts of one or more dialkylthioureas sufficient to reduce their corrosivity to carbon steel as discussed in copending application Ser. No. 331,001, filed Dec. 15, 1981, the disclosure of which is incorporated herein by reference. As pointed out in that copending application, compositions having urea/sulfuric acid molar ratios greater than 2 or less than 1 are substantially more corrosive to carbon steel than are compositions having molar ratios within the range of 1 to 2. Furthermore, the corrosivity of compositions having urea/sulfuric acid molar ratios within the range of 1 to 2 is influenced only to a very minor extent by the dialkylthiourea compounds under all conditions investigated. Also, compositional and inhibitor effects on carbon steel corrosion differ markedly from the effects of the same variables on stainless steel corrosion. The reasons for these anomalies have not been defined with certainty.

Figure 3:
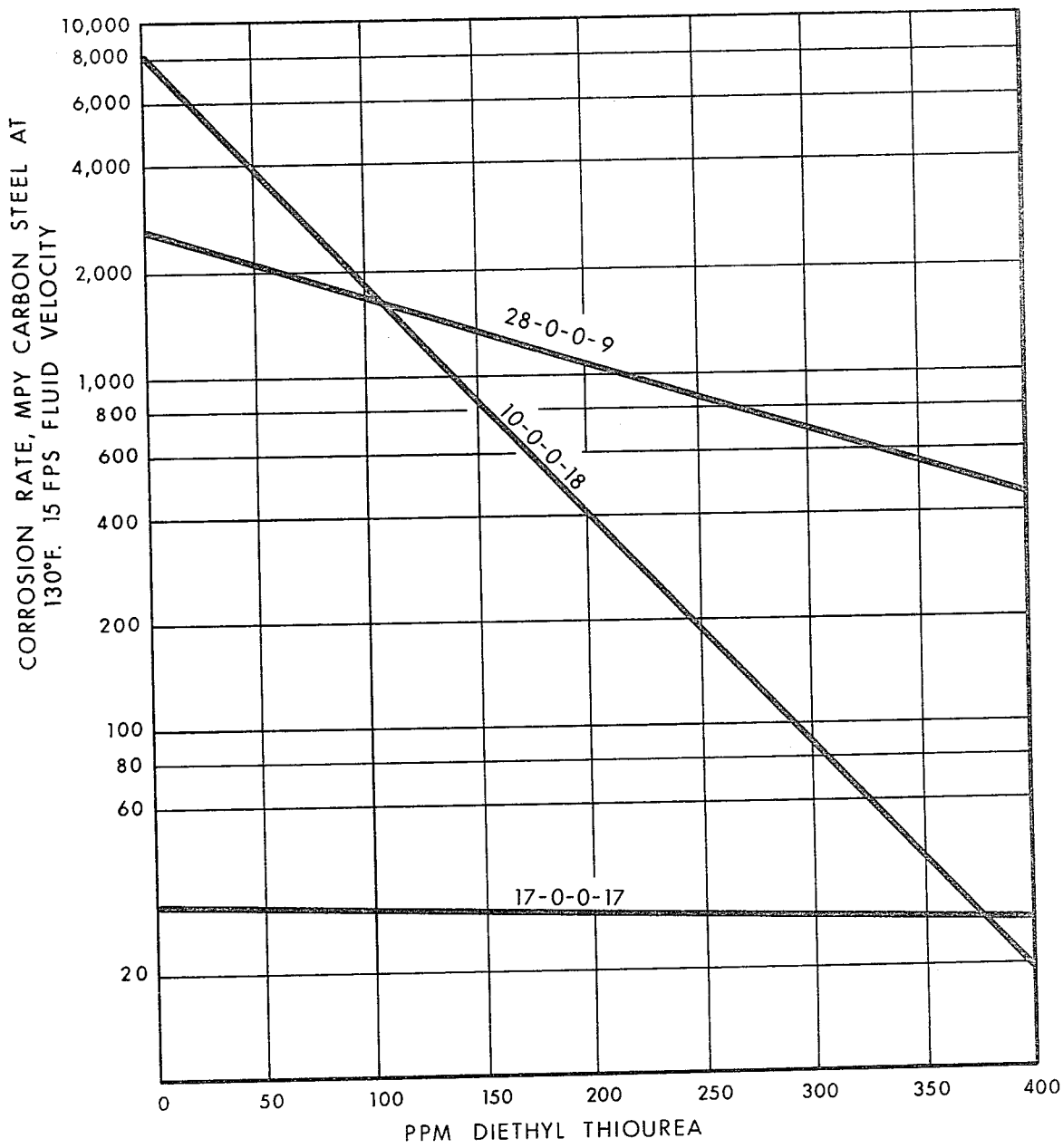
FIG. 3 is a correlation of AISI C-1010 carbon steel versus diethylthiourea concentration for the three designated compositions.

These factors are illustrated, in part, in FIG. 3, which is a correlation of carbon steel (AISI C-1010) corrosion rate at 130° F. and 15 feet per second fluid velocity, versus diethylthiourea concentration in parts per million. As illustrated in FIG. 3, 10-0-0-18, having a urea/sulfuric acid molar ratio of 0.633, corroded carbon steel at a rate in excess of 8000 miles per year. However, the corrosivity of that formulation decreased dramatically as diethylthiourea (DETU) concentration was increased, and was reduced to a level of approximately 18 mils per year at a DETU concentration of 400 ppm. The corrosivity of 10-0-0-18 would be even lower at higher DETU concentrations.

Although the 28-0-0-9 composition had a lower corrosivity in the absence of DETU than did 10-0-0-18, its corrosion reate of 2600 mils per year was still excessive. Nevertheless, the corrosivity of 28-0-0-9 (urea/sulfuric acid of 3.57) was reduced to approximately 450 mils per year at 400 ppm DETU. The corrosivity of this formulation could be reduced to acceptable levels (at the defined temperature and flow rate) with higher DETU concentrations.

In contrast to 10-0-0-18 and 28-0-0-9, the corrosivity of the 17-0-0-17 composition (urea/sulfuric acid molar ratio of 1.143), was only 31 mils per year at 130° F. and 15 feet per second fluid velocity in the absence of diethylthiourea. This corrosion rate is acceptable in many situations involving temporary or intermittent exposure. Furthermore, the corrosivity of 17-0-0-17 was reduced only nominally to a level of approximately 28 mils per year at a diethylthiourea concentration of 400 ppm. At that point, the corrosivity of 17-0-0-17 actually exceeded that of 10-0-0-18.

These distinctions in carbon steel corrosion rate and inhibitor response persist under all conditions of temperature and flow rate and over a wide range of dilution. The corrosivity of all formulations to carbon steel increases with temperature, flow rate and dilution with water in the presence or absence of the thiourea inhibitors. For instance, the corrosion rate for 10-0-0-18 at 80° F. without dilution under static conditions in the absence of corrosion inhibitor was only 16 mils per year compared to 1483 mils per year with 40 percent dilution. Similarly, increasing fluid velocity from zero to 15 feet per second increased corrosion rate from 16 MPY to 4489 MPY in the absence of inhibitor at zero dilution. Similar relative effects were observed with 17-0-0-17 and 28-0-0-9.

In marked contrast to the dissimilar corrosivity of 17-0-0-17 and 28-0-0-9 on carbon steel, the close analogs of those compositions—18-0-0-17 and 29-0-0-9—exhibit remarkably similar corrosivity toward stainless steel at 150° F. and 15 feet per second fluid velocity, as illustrated in FIG. 2. They also exhibit remarkably similar response to inhibitor (cupric ion) concentration. For instance the corrosivity of 18-0-0-17 to AISI 316 stainless steel decreases to approximately zero at 50 ppm cupric ion concentration. By comparison, the corrosivity of 17-0-0-17 to carbon steel was relatively uneffected by diethylthiourea as illustrated in FIG. 3.

Effective thiourea compounds include dialkylthioureas in which each alkyl group has from 1 to about 4 carbon atoms. Combinations of these compounds can be used. Exemplary are dimethylthiourea; dipropylthiourea; dibutylthiourea; methyl,propylthiourea; ethyl,propylthiourea; and the like. The higher cupric ion concentrations markedly reduce the inhibiting effect of butyl-substituted thioureas for reasons that are not fully understood. Thus, the methyl, ethyl and propyl substituted thioureas are presently preferred for use in compositions containing 50 ppm or more of cupric ion. Yet, cupric ion has little, if any, detrimental effect on the lower alkylthioureas.

The thiourea compounds are usually employed at concentrations of at least about 25 ppm, generally at least about 50 ppm, and up to 1000 ppm or more. Different inhibitor concentrations are required to achieve comparable corrosivity with different compositions or under different conditions of temperature, flow rate or degree of dilution. Optimum inhibitor concentration will also vary from one composition to the next due to the dramatic differences in corrosivity and inhibitor effect between different compositions as illustrated in FIG. 3.

The inhibitor concentration required to obtain a certain carbon steel corrosion rate with a given composition at a particular temperature and flow velocity can be readily determined by the test described above for determining optimum cupric ion concentration. Standard samples of the carbon steel can be exposed to different samples of the given composition containing various inhibitor concentrations at the temperature and flow velocity involved. The results of this test will provide a correlation similar to that illustrated in FIG. 3.

Stainless steels are usually classified in three different categories—austentic, ferritic, and martensitic steels— which have in common the fact that they contain significant amounts of chromium and resist corrosion and oxidation to a greater extent than do ordinary carbon steels and most alloy steels. Austenitic stainless steels are the most common alloys of this group and are characterized, in part, by minimum chromium contents of about 16 percent and minimum nickel contents of about 7 percent. AISI types 302, 303, 304, and 316 are several of the more extensively used austenitic stainless steels.

Ferritic stainless steels are generally characterized, in part, by the fact that they contain chromium only (in addition to the other components of carbon steel) or only very minor amounts of other alloying elements. Martensitic stainless steels are also characterized by the fact that they contain only chromium as the primary alloying element and minor, if any amounts, of other alloys, and by their characteristic of being hardenable by heat treatment.

Carbon steels, as that term is used herein, include alloys of iron and 0.02 to about 1.5 weight percent carbon, and less than 4, usually less than 2 weight percent of alloying elements such as cobalt, nickel, molybdenum, boron, manganese, copper, tungsten, cobalt, silicon and the rare earth elements. Carbon steels are conventionally produced from pig iron by oxidizing out the excess carbon and other impurities such as phosphorous, sulfur, and silicon with an oxygen-rich gas and iron ore in any one of several processes such as the open hearth, Bessemer, basic oxygen, or electric furnace processes.

The urea-sulfuric acid compositions of this invention can be produced by the reaction of urea and sulfuric acid and, optionally water, by either batch or continuous processes. The more concentrated solutions, i.e., those containing less than 25 weight percent, preferably less than 15 weight percent water are particularly preferred, and these are preferably produced by the reaction of solid urea and concentrated sulfuric acid by the methods described in my copending application Ser. No. 318,629 filed Nov. 5, 1981, which is incorporated herein by reference.

Those processes can be used to consistently produce urea-sulfuric acid reaction products of predetermined composition and crystallization temperature essentially or completely free of decomposition products such as sulfamic and/or ammonium sulfamate. Generally, the reaction products can be produced by separately and simultantously feeding urea, sulfuric acid and, optionally, water, as required, into a reacting liquid phase contained in a reaction zone in proportions corresponding to the relative proportion of each respective component in a predetermined product composition within the ranges discussed above. The urea and sulfuric acid react within the reaction zone under controlled conditions in which reaction temperature is always maintained at a point below about 176° F. and below the incipient decomposition temperature of the pre-determined product.

Even minor decomposition of the reactants and/or product during manufacture or otherwise results in the formation of known toxic materials including ammonium sulfamate and/or sulfamic acid. Thus, adequate temperature control is imperative to prevent decomposition which, once commenced in a large volume of inadequately cooled material, can lead to very rapid temperature escalation, e.g., up to 600° F. and higher, and to the literal explosion of the reactor and associated processing facilities.

The magnitude of the reaction exotherm and incipient decomposition temperature variations are illustrated in the following table:

| Composition | Incipient Decomposition Temperature | Heat of Reaction BTU's per Ton |
|---|---|---|
| 29-0-0-9 | 158° F. | 73,600 |
| 18-0-0-17 | 176° F. | 173,400 |
| 9-0-0-25 | 176° F. | 149,500 |
| 10-0-0-19 | 176° F. | 195,500 |

The heats of reaction reported in the foregoing table were determined calorimetrically using the reaction of prilled urea with 98 percent sulfuric acid and the amount of water required for the designated formulation.

Incipient decomposition temperatures can be determined by very gradually heating a solution of the designated composition until gas evolution is first observed. The incipient decomposition temperature of any formulation can be determined by this procedure.

The evolved gas is apparently carbon dioxide and, in the absence of unreacted sulfuric acid, may also comprise ammonia. In the presence of unreacted sulfuric acid, a condition that exists in the reaction zone, the ammonia would react very exothermically with sulfuric acid to increase solution temperature and heat load at a rate even faster than that occasioned by the sulfuric acid-urea reaction. This mechanism may be partially responsible for the observed autocatalytic decomposition of the more concentrated compositions at elevated temperatures.

As a general rule, incipient decomposition temperatures for these compositions range from about 155° F. to about 176° F. with the higher decomposition temperatures being associated with products having higher acid-to-urea ratios.

Gross system temperature is not an adequate indication of incipient decomposition at localized points within a relatively large volume of solution, e.g., in a commercial reactor. For instance, the direct addition of concentrated sulfuric acid to a large volume of urea as described in U.S. Pat. No. 4,116,664 referred to above, will invariably result in localized overheating and temperatures in excess of incipient decomposition temperatures even though the average temperature for the bulk of urea may be somewhat lower. This was confirmed by the fact that samples of materials produced in the process described in that patent were found to contain as much as 5 to 6 weight percent of the decomposition products ammonium sulfamate and/or sulfamic acid.

Continuous processing is preferred, particularly in the manufacture of the more concentrated solutions, since it improves process stability and the control of composition, reaction temperature, crystallization point and corrosivity. All of these factors are important for different reasons.

Accuate control of reaction phase composition is closely related to temperature control due to the highly exothermic nature of the sulfuric acid-urea reaction. It is also closely related to crystallization point and corrosivity; minor variations in product composition can significantly affect both properties. Significant variation in crystallization point can result in solids formation or complete "setting up" of the product in lower temperature treating, storage or application facilities. Increased corrosivity occasioned by composition changes can dramatically increase the corrosion of the reactor and processing facilities, particularly at elevated processing temperatures.

These several characteristics can be controlled by gradually and simultaneously adding urea, concentrated sulfuric acid and water to the reaction zone at relative rates corresponding to the concentration of each component in a predetermined product and cooling the resultant reacting liquid phase sufficiently to maintain it at a temperature below its incipient decomposition temperature and below 176° F., at all times. As pointed out above, bulk system temperature may not accurately indicate the presence or absence of localized overheating unless the reacting liquid phase is adequately agitated and thoroughly mixed during the course of the reaction.

Although the reaction will proceed at relatively low temperatures, it becomes too slow to be economically desirable at temperatures much below 120° F. Accordingly, the reaction is usually run at temperatures of at least 120° F., preferably at least about 130° F., and below 176° F., preferably below about 160° F., and most preferably about 150° F. or less. The lower temperatures, e.g., of about 150° F.–160° F., or less, are particularly preferred.

The feed rates of all three components, and the composition of the reacting liquid phase, should be maintained as closely as possible to the stoichiometric proportion of each respective component in the predetermined product. Thus, the concentration of each component should be maintained within about 2 percent, preferably within 1 percent or less, of its stoichiometric value in the product.

In the preferred method in which a portion of the reaction phase is removed from the reaction zone and cooled by direct air contact heat exchange, some water is lost from the system and must be made up by increasing the water feed to the reaction zone by an amount proportional to the rate of water loss in the cooler.

The close tolerances of reactant composition and temperature will generally allow control of product crystallization temperature within 10° F., preferably within 5° F. or less, of the desired crystallization temperature.

Although the considerable heat of reaction theoretically can be dissipated by essentially any cooling means, such as cooling coils within the reactor, heat dissipation and temperature control are facilitated by assuring that the reaction zone into which the urea-sulfuric acid and water are introduced, contains an amount of a mixture of reactants and reaction product corresponding to at least about 0.1, preferably at least about 0.2 times the hourly feed rate in batch systems, and at least about 0.5, usually at least about 1, and preferably at least about 2 times the hourly feed rate in the preferred continuous process. Although somewhat lower reactor volumes would be adequate to control temperature in the continuous process in some cases, they would not be adequate to assure complete reaction of the customary forms of urea feeds, i.e., prills and/or granules. Longer holding times and thus larger reactor inventories relative to product withdrawal rate and reactant feed rate are preferred in the continuous process to assure that the withdrawn product does not contain unreacted urea.

The minimum reactor volume required to prevent the discharge of unreacted urea during continuous operation can be defined by the following expression which is unique to this reaction system:

$$V_o = \frac{u}{k}(14.3 \, d^2 - 1)$$

where k is the first order rate constant in reciprocal minutes, d is the diameter of the largest urea particles in millimeters, $V_o$ is the volume of the liquid phase within the reaction zone in gallons, and u is the production rate from the reaction zone in gallons per minute.

From this relationship, it can be seen that theoretically very small reactor volumes could be used with very small diameter urea feeds, e.g., urea dust. As a practical matter, however, minimum volumes of about one-half hourly production are required to provide sufficient inventory for adequate cooling to prevent incipient decomposition and for more effective process control.

The first order rate constant can be determined from the expression unique to this system:

$$k = \frac{1}{t}(\ln d^2 + 2.659)$$

where t is the time in minutes required for dissolution of the type of urea feed, e.g., prills, pellets, granules, etc.

The dissolution rate varies with urea type, e.g., prilled urea or granular urea. Prilled urea is usually less dense and somewhat more porous than is granular urea, and is produced by forming droplets of molten urea in a prilling tower of sufficient height to allow the urea droplets to solidify during their descent. Granular ureas are usually produced by spraying molten urea onto urea "seeds" or dust in granulating apparatus such as pan or drum granulators.

The reaction rate constant can be determined experimentally for any given product composition and urea feed type by determining the rate at which the urea particle dissolves in the given formulation.

The reaction rate is first order and varies markedly with temperature. Experimentally observed values for the rate constants for 18-0-0-17, 29-0-0-9, and 10-0-0-19, and the effect of temperature on the rate constant for each product using prilled urea and granular urea, are graphically illustrated in FIGS. 4 and 5, respectively.

The rate of urea dissolution can be determined by any one of several means. The data illustrated in FIGS. 4 and 5 were obtained by suspending several urea prills or granules of known diameter in the selected composition with very mild agitation sufficient only to suspend the particles in the liquid phase. The elapsed time within which the urea particles disappeared was determined by visual observation and was taken as the value of t for that combination of urea type and product solution. As discussed above, particle diameter is taken as the diameter of the largest urea particles in the feed. The largest particles in most prilled ureas have diameters of at least about 1 millimeter, usually about 2 millimeters. Granular ureas may be somewhat larger.

Knowing the value of k, the minimum reactor volume required for continuously producing any product at a given temperature can be determined from the expression for $V_o$. The same procedure can be used to determine the value of t, and thus the values of k and $V_o$ for any combination of urea type and reactant phase composition.

Figure 4:
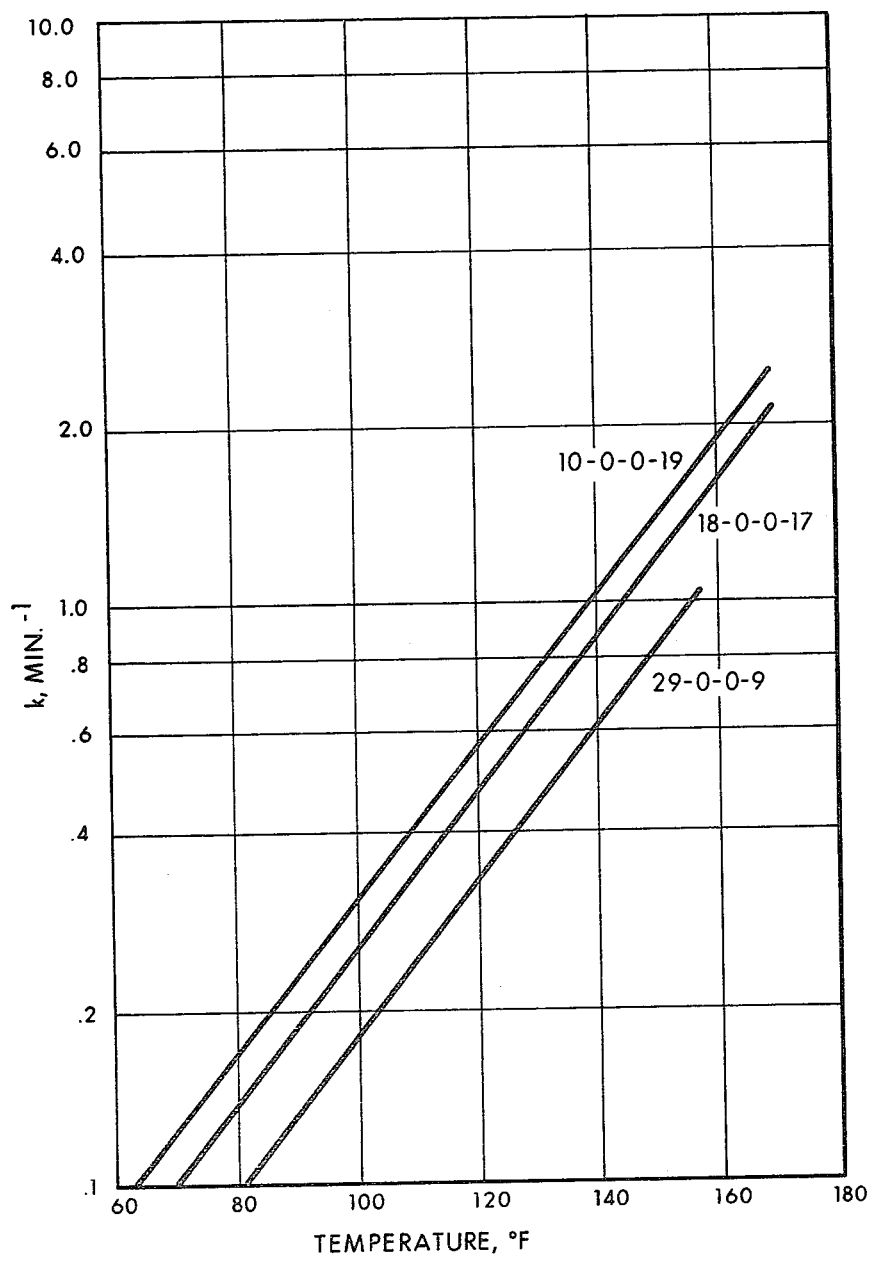
FIG. 4 is a correlation of the first order reaction rate constant versus temperature for the three designated urea-sulfuric acid reaction products using prilled urea feed.
Figure 5:
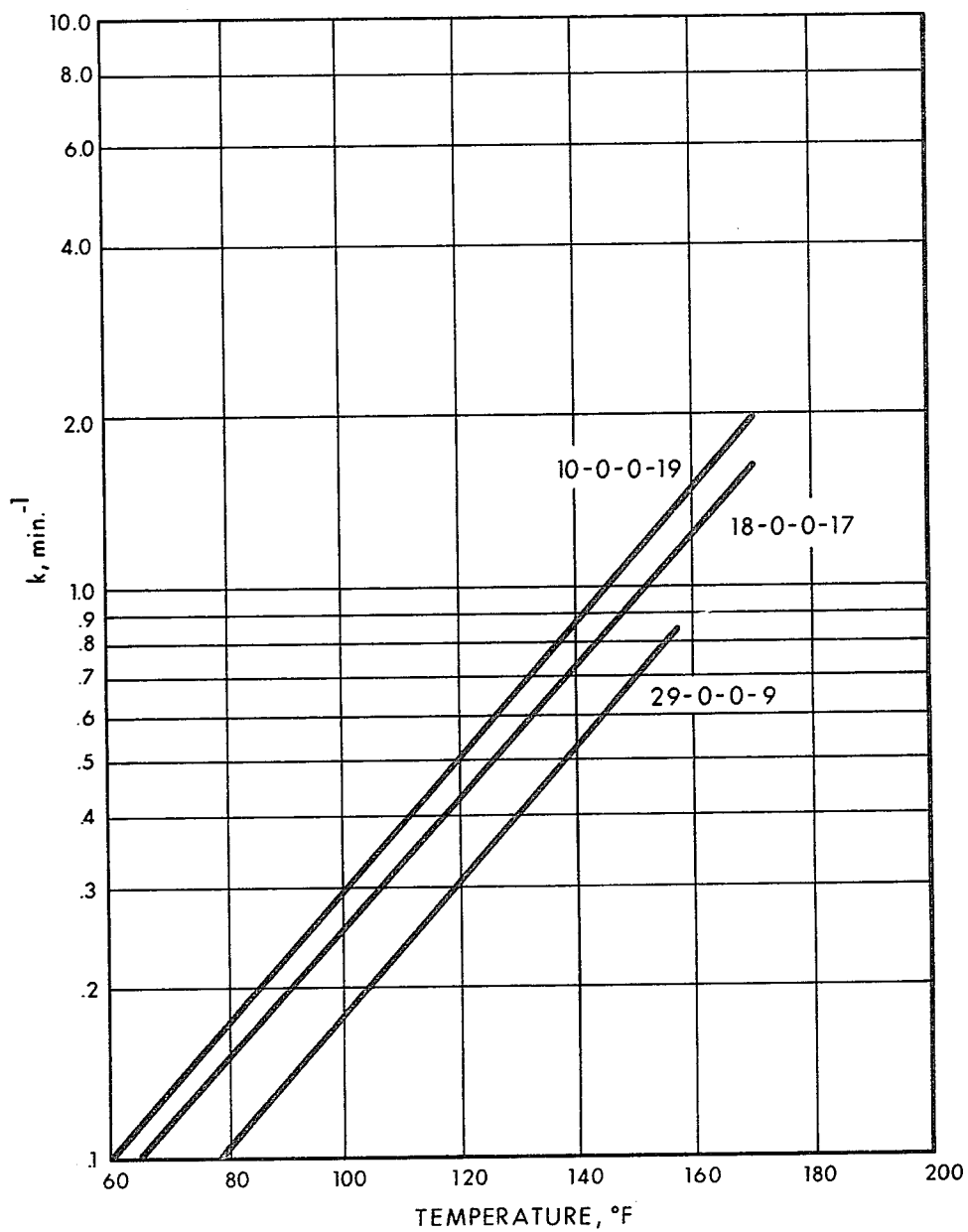
FIG. 5 is a correlation of the reaction rate constant with temperature for the three designated urea-sulfuric acid reaction products using granular urea feed.

As can be seen from FIGS. 4 and 5, the reaction rate constant k diminishes markedly with temperature. Thus, from the relationship between $V_o$ and reaction rate constant discussed above, it can be seen that larger reactor volumes are required to obtain the same production rate of the same product at lower reaction temperatures.

Adequate control of the factors discussed above, particularly heat load, solution temperature, composition, crystallization point and corrosivity, is particularly important in industrial scale reactors of relatively large volume in which the excess heat associated with decomposition cannot be rapidly dissipated. This is especially true in the production of higher acid content compositions, e.g., those having $H_2SO_4$/urea weight ratios above 1. Most commercial systems will have reaction zone volumes of at least about 50 gallons, usually at least about 100 gallons, and most often in excess of 500 gallons. The reaction phase is relatively viscous even at reaction temperatures, and that factor, combined with the relatively low heat capacity of these compositions, makes adequate temperature control and rapid heat exchange even more difficult in the large volumes associated with commerical production.

Figure 6:
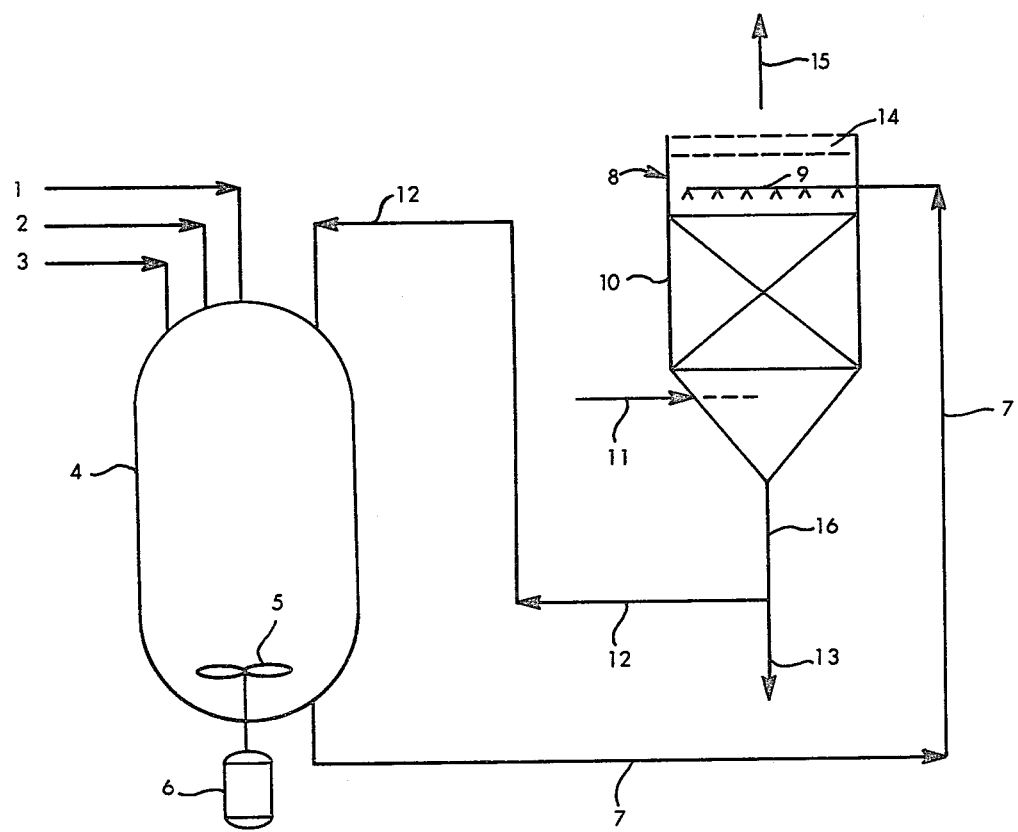
FIG. 6 is a schematic illustration of an apparatus and process system suitable for use in the manufacture of concentrated urea-sulfuric reaction products.

The process can be better understood by reference to FIG. 6 which is a schematic illustration of a preferred continuous method employing countercurrent direct air heat exchange.

Solid urea, water and sulfuric acid are simultaneously and continuously added through pipes 1, 2, and 3 to reactor 4 provided with efficient agitating means, such as impellar 5 driven by motor 6 or other means. The reacting liquid phase is continuously passed from reactor 4 through pipe 7 to spray nozzles 9 in the direct air heat exchanger 8. Ambient air or cooled air is introduced to the lower portion of the heat exchanger through pipe 11 or other means, and passes upwardly through packed section 10 into direct contact with downward flowing liquid phase. Following contact with the acid, the warmed air passes through demister section 14 and can be emitted directly to the atmosphere. Even at elevated temperatures very little sulfate is present in the effluent air. Cooled product is removed from heat exchanger 8 through pipe 16 and is either passed to storage via pipe 13 or is returned as cooling medium to reactor 4 by pipe 12.

Urea can be fed in any available form, such as prills, granulars, powder and the like. The minor variations in the purity of commercial ureas can be sufficient to significantly affect process conditions, even though nitrogen content usually varies from about 46 to about 46.6 weight percent. The urea feed is preferably periodically analyzed for nitrogen content and its feed rate adjusted accordingly in view of the stoichiometry of the desired product.

The sulfuric acid feed can be concentrated sulfuric acid, usually 92 to 98 weight percent $H_2SO_4$, or it can be diluted with water before introduction into the reaction zone. Fuming sulfuric acid can also be used. Essentially any acid source is suitable. Spent alkylation acid can also be used in this process. Concentrated sulfuric acid is presently preferred due to commercial availability, and the markedly higher corrosivity of more dilute acid solutions.

If dilute acid feeds are employed, the amount of water added with the acid feed should not exceed the amount permitted in the product. This amount varies substantially from product to product. For instance, the minimum acid concentration that can be employed in the manufacture of 18-0-0-17 is 85 weight percent $H_2SO_4$. Somewhat lower acid concentrations can be used in the manufacture of other products, e.g., 74.2 weight percent $H_2SO_4$ for 10-0-0-19. The use of more dilute acids will result in the addition of excess water to the reaction zone which will result in the formation of an off-specification product unless the excess water is somehow removed in the process.

Once the continuous process is commenced, it can be run indefinetly provided that sufficient provision is made to control corrosion and that changes in product composition are not required.

In starting up either a batch or continuous process, a product inventory can be manufactured in the reaction vessel by gradual addition of the reactants in stoichiometric proportions, provided that sufficient cooling is available to maintain the reacting mixture at a temperature below the incipient decomposition temperature. In the alternative, an inventory of material produced in a previous operation can be used. In either event, the initial inventory, or heel, must be of the same composition as that of the desired product so that deviations in composition, crystallization point, heat of reaction or corrosivity do not occur during the process.

During startup, the initial inventory may be of lesser volume than that ultimately maintained in the reactor zone to assure complete reaction. The initial heel enables more adequate control of reaction temperature developed by the exothermic reaction during startup.

The heat of reaction involved in the formation of any product can be determined calorimetrically by reacting the selected urea and sulfuric acid feeds and water, when required, under closely controlled temperature conditions sufficient to prevent incipient decomposition. The heat of reaction for a given product can then be used to calculate the total heat load on a given system, and thus the cooling capacity required for a given production rate. In the alternative, the heat of reaction can be calculated from the following expressions:

$$(NH_2)_2CO(solid) \longrightarrow (NH_2)_2CO(liquid) \quad -2.5 \text{ Kcal/g.mole}$$

$$(NH_2)_2CO(solid) \xrightarrow{(H_2O)} (NH_2)_2CO(solution) \quad -4.7 \text{ Kcal/g.mole urea}$$

$$H_2SO_4 + x(NH_2)_2CO \longrightarrow H_2SO_4 \cdot x[(NH)_2CO] \quad 13.0 \text{ Kcal/g.mole urea}$$

$$H_2SO_4 + x(NH_2)_2O \longrightarrow H_2SO_4 \cdot x(H_2O) \quad 6.5 \text{ Kcal/g.mole } H_2O$$

The overall reaction is illustrated by the equation:

$$x(NH_2)_2CO(solid) + yH_2SO_4(liquid) \xrightarrow{H_2O} [(NH_2)_2CO]_x \cdot (H_2SO_4)_y \text{ solution.}$$

Applying these expressions to the amount of solid urea and sulfuric acid added to the reaction zone will yield the amount of heat to be expected in the reaction. That value in turn allows the determination of production rates permissible in any system assuming the process is limited by cooling capacity, or conversely, the cooling capacity that must be provided for the production of that product at a given rate.

The high viscosity, low specific heat, low maximum allowable temperature, high corrosivity to conventional alloys at high fluid velocity, and low water content of these products (in the absence of corrosion inhibitors), place severe limitations on conventional heat exchangers. Nevertheless, conventional designs such as shell and tube, coil, etc., can be used, although they must be designed in view of the product characteristics mentioned above.

The reacting liquid phase can be adequately cooled by direct contact countercurrent heat exchange with ambient air making use of a relatively simple cooling unit design such as that illustrated in FIG. 6. This approach mitigates the problems associated with the high corrosivity, high viscosity and low specific heat of these compositions. The direct air heat exchange method adequately cools the reacting liquid phase even though it has very low vaporizable water content, and does so without introducing or removing uncontrollable amounts of water to or from the reaction phase or polluting the atmosphere.

The contact section of the cooler illustrated in FIG. 6 can consist of any corrosion and heat resistant shell, e.g., stainless steel, and an adequate quantity of acid-resistant packing of any one of numerous types. Acceptable packing materials include plastic or ceramic saddles and the like.

The design of the direct contact exchanger for any particular operation should be based upon the highest heat load anticipated which is a function of product composition and production rate, and can be established by testing different combinations of packing material, packing section design, product flow rate and air flow rate through the exchanger.

As a practical matter, the packing section should have height to diameter ratio of at least about 1 and, for most packing materials, should be operated at liquid flow rates of 25 to about 200 pounds per hour per cubic foot of packing and air flow rates of about 25 to about 100 cubic feet per minute per cubic foot of packing material. Significantly higher liquid flow rates should be avoided to avoid flooding the cooler while higher air flow rates should be avoided to prevent excessive resistance to downward liquid flow and product carryover into the demister section.

Continuous monitoring and compensation for water removal from the system is preferred and is necessary for precise control of composition, temperature, and corrosion. This can be achieved by monitoring product or reactor phase composition or water removal rate in the cooler and adding water as required to the reaction zone.

Even small variations in sulfuric acid feed concentration, or minor excursions in product composition, can produce sharp changes in the water removal rate in the direct air heat exchanger. This occurrence has a feedback effect on the overall process which alters reaction temperature and cooler efficiency and can result in unacceptable swings in product and reactant phase composition. This problem can be mitigated by monitoring the rate of water removal from the system and by precise control of product composition.

Product composition can be determined by periodically sampling the product effluent and analyzing for sulfuric acid, urea and water and gradually modifying reactant feed rates as necessary to maintain specification product composition. Periodic chemical analysis of the product or reaction phase is an effective control alternative. Acid content can be determined by standard acid titration techniques, and both acid and urea concentrations can be determined by mass spectrographic analysis, high precision infrared or liquid chromatographic analysis, or by standard wet chemical test procedures for urea and sulfuric acid. Having determined sulfuric acid and urea concentration, water can be determined by difference. Product composition is also reflected by specific gravity and refractive index. Thus, one or both of these tests can be used in combination with total acidity to determine urea and sulfuric acid concentrations, while water concentration can be determined by difference.

The cupric ion-containing corrosion inhibitors and the dialkylthiourea compounds, when employed, can be added to the urea-sulfuric acid compositions either during or after completion of the reaction. However, it is presently preferred that the corrosion inhibitors be added directly to the reaction zone, e.g. along with one of the feeds, to minimize corrosion of manufacturing and storage facilities.

EXAMPLE

The inhibitors listed in Table 1 were evaluated for their effectiveness in reducing the corrosion of carbon steel (AISI C-1010) by 29-0-0-9 at 130° F. under static conditions and the corrosion of stainless steel (AISI type 316) by 10-0-0-19 at 170° F. and 15 feet per second fluid velocity as indicated in the table. Sample steel coupons of known weight and surface area were suspended in a large excess of the designated compositions having the inhibitor concentrations shown in the table. Each solution was maintained at the indicated temperature throughout the test period. A 15 fps. fluid velocity was maintained in the 10-0-0-19 tests by attaching the 316SS coupons to a rotating rod immersed in each sample solution. After 72 hours exposure, the coupons were removed from their respective solutions, cleaned and weighed to determine weight loss and corrosion rate in mils per year (MPY). The results are listed in Table 1.

TABLE 1

| INHIBITOR | Concentration ppm | CORROSION RATE, MPY | |
|---|---|---|---|
| | | 29-0-0-9 Carbon Steel 130° F., static | 10-0-0-19 Stainless Steel 170° F., 15 fps. |
| None | | 220 | 625 |
| Ammonium Thiocyanate | 10,000 | 565 | 691 |
| Thiomalic Acid | 10,000 | 882 | 817 |
| Potassium Dichromate | 10,000 | 712 | 410 |
| Potassium Permanganate | 10,000 | 735 | 356 |
| Thiourea | 10,000 | 993 | 615 |
| 1,3-Dibutylthiourea | 10,000 | 4 | 610 |
| Diethylthiourea | 10,000 | 31 | 709 |
| Potassium Chlorate | 10,000 | 1,200 | 950 |
| Dimethylsulfoxide | 10,000 | 291 | 575 |
| Tetramethylammonium Chloride | 175 | 260 | 655 |
| Cupric Ion (as CuSO4) | 300 | 375 | <1 |
| Cupric Ion (as CUSO4) | 250 | NA | 152 |
| Sodium Sulfate | 10,000 | NA | 510 |
| Sodium Sulfide Nonylhydrate | 5,000 | 830 | 685 |
| Ammonium Nitrate | 2,000 | 1,465 | 898 |
| Ammonium Phosphate (10-34-0) | 10,000 | 231 | NA |

Of all the inhibitors tested on carbon steel, only the alkylthioureas had any beneficial effect, and that effect was dramatic. The other inhibitors either had no effect or significantly increased conversion rate.

Similar results were observed in the 10-0-0-19 tests on stainless steel. Cupric ion was the only agent that significantly reduced corrosion at a practically low concentration. Dibutylthioureas had no significant effect on stainless steel corrosion and diethylthiourea slightly increased the corrosivity of 10-0-0-19 toward stainless steel. Similarly, cupric ion increased the corrosivity of 29-0-0-9 to carbon steel.

Numerous variations and modifications of the concepts of this invention will be apparent to one skilled in the art in view of the aforegoing disclosure, drawings, and the appended claims, and are intended to be encompassed within the scope of this invention as defined by the following claims.

I claim:

1. A composition of matter comprising about 5 to about 75 weight percent urea, about 5 to about 85 weight percent sulfuric acid and about 0 to about 75 weight percent water in which said urea and sulfuric acid, in combination, constitute at least about 25 weight percent of said composition and in which at least a portion of said urea and sulfuric acid are present as a member selected from the group consisting of monourea sulfate, diurea sulfate, and combinations thereof, containing a corrosion inhibiting amount of a cupric ion-containing compound sufficient to reduce the corrosivity of said composition to stainless steel.

2. The composition defined in claim 1 containing less than about 50 weight percent water wherein said sulfuric acid and said urea, in combination, constitute at least about 50 weight percent of said composition.

3. The composition defined in claim 1 containing less than about 25 weight percent water, wherein said sulfuric acid and said urea, in combination, constitute at least about 75 weight percent of said composition.

4. The composition defined in claim 1 wherein the weight ratio of said sulfuric acid to said urea is about 1.5 or less and said composition contains an amount of said cupric ion-containing compound corresponding to a cupric ion concentration of at least about 25 ppm.

5. The composition defined in claim 1 wherein the weight ratio of said sulfuric acid to said urea is greater than about 1.5 and said composition contains an amount of said cupric ion-containing compound corresponding to a cupric ion concentration of at least about 250 ppm.

6. The composition defined in claim 1 wherein said cupric ion-containing compound is selected from the group consisting of cupric oxide, cupric sulfate, cupric nitrate, cupric halides, and combinations thereof.

7. The composition defined in claim 1 containing a corrosion inhibiting amount of cupric sulfate.

8. The composition defined in claim 1 containing a corrosion inhibiting amount of a dialkylthiourea in which each alkyl group has from one to about four carbon atoms sufficient to reduce the corrosivity of said composition to carbon steel.

9. The composition defined in claim 8 having a urea/sulfuric acid mole ratio greater than 2 or less than 1.

10. The composition defined in claim 8 wherein each of said alkyl groups in said dialkylthiourea have from 1 to 3 carbon atoms.

11. A composition of matter relatively noncorrosive to stainless steel comprising a liquid urea-sulfuric acid reaction product containing about 10 to about 70 weight percent urea, about 10 to about 80 weight percent sulfuric acid and about 0 to about 25 weight percent water in which said urea and sulfuric acid, in combination, constitute at least about 75 weight percent of said composition and in which at least a portion of said urea and said sulfuric acid are present as a member selected from the group consisting of monourea sulfate, diurea sulfate, and combinations thereof, containing a corrosion inhibiting amount of a cupric ion-containing compound corresponding to a cupric ion concentration of at least about 50 ppm sufficient to reduce the corrosivity of said composition to stainless steel.

12. The composition defined in claim 11 having a urea/sulfuric acid mole ratio greater than 2 or less than 1 and comprising a corrosion inhibiting amount of a dialkylthiourea in which each alkyl group has from 1 to about 4 carbon atoms sufficient to reduce the corrosivity of said composition to carbon steel.

* * * * *